W. R. KERR.
ADJUSTABLE FASTENING MEANS FOR RIGIDLY SECURING STIRRUPS OR SHEAR MEMBERS TO TENSION AND OTHER BARS USED IN REINFORCED CONCRETE CONSTRUCTION.
APPLICATION FILED DEC. 10, 1913.
1,114,147. Patented Oct. 20, 1914.
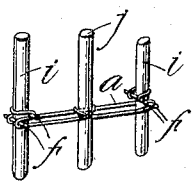
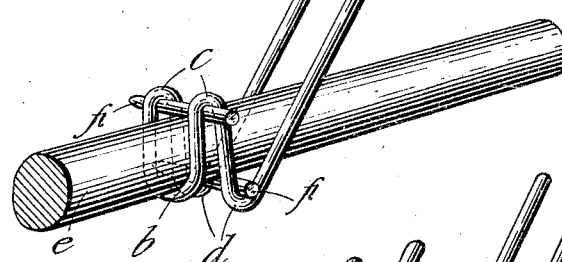
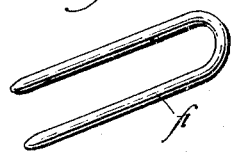
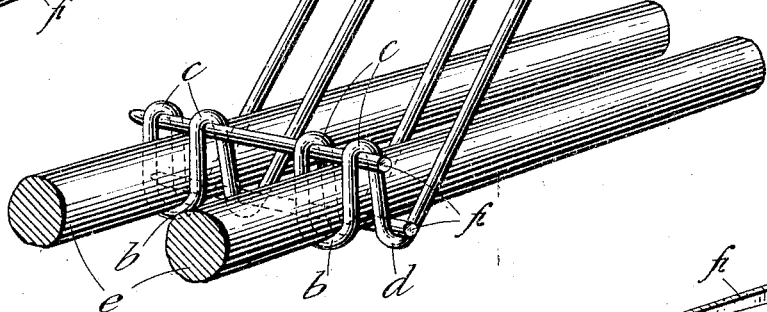
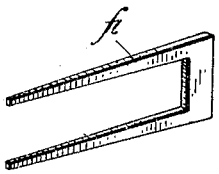
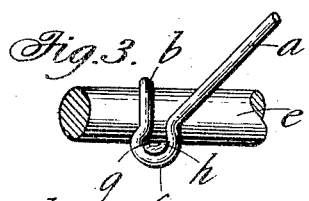
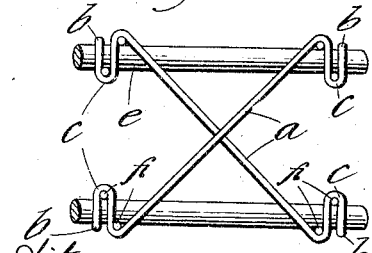
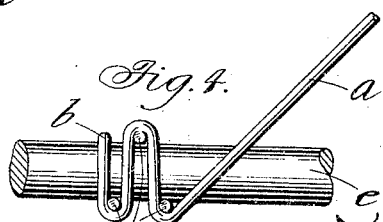

UNITED STATES PATENT OFFICE.

WILLIAM RUSSELL KERR, OF MALVERN, VICTORIA, AUSTRALIA, ASSIGNOR OF ONE-HALF TO WILLIAM HENRY MURPHY, OF HAWTHORN, VICTORIA, AUSTRALIA.

ADJUSTABLE FASTENING MEANS FOR RIGIDLY SECURING STIRRUPS OR SHEAR MEMBERS TO TENSION AND OTHER BARS USED IN REINFORCED CONCRETE CONSTRUCTION.

1,114,147.  Specification of Letters Patent.  Patented Oct. 20, 1914.

Application filed December 10, 1913. Serial No. 805,794.

*To all whom it may concern:*

Be it known that I, WILLIAM RUSSELL KERR, of No. 1 The Terrace, Malvern, in the State of Victoria, Commonwealth of Australia, have invented certain new and useful improvements in adjustable fastening means for rigidly securing stirrups or shear members to tension and other bars used in reinforced concrete construction, of which the following is a specification.

This invention provides improvements in adjustable fastening means for rigidly securing shear members or stirrups (hereinafter for brevity referred to as shear members) to tension and other bars used in reinforced concrete construction and it has for its object the effecting of an increase in efficiency and economy.

The invention, which is exceedingly simple, strong and rigid in its construction, permits of the shear members being readily spaced at any required distances apart on the tension or other main reinforcing bars to take stresses for any given design.

The invention consists briefly in looping and shaping the ends of shear members to engage main reinforcing bars and in the employment of pins or keys which exert diametrically opposing pressures between the opposite sides of the bar and the loops of the shear member.

The invention comprises modifications of the preferred construction of fastening means and its adaptation to ties or ligatures connecting reinforcing bars. Such adaptation of the invention has been found specially convenient for connecting the vertical reinforcing members of columns or the like constructions.

Referring now to the accompanying drawings illustrating the invention: Figure 1 is a view in perspective of part of a main reinforcing bar with a shear member secured thereto. Fig. 2 is a similar view and shows a convenient manner of attaching the shear members to a plurality of main reinforcing bars when the same are located closely together and parallel with each other. Figs. 3 and 4 illustrate modifications in the construction of the shear member and the manner of attachment to a main reinforcing bar. Fig. 5 is a view in side elevation illustrating an adaptation of the invention, and shows means of spacing two or more bars acting in direct compression. Figs. 6 and 7 are views in perspective of constructional details hereinafter described. Fig. 8 is a view in perspective showing the adaptation of the invention to ties or ligatures connecting vertical reinforcing bars.

In the drawings $a$ indicates a shear member which is made of bar iron, steel or other metal of preferred cross-section and which may be of a desired length to suit the particular construction contemplated. The bar to form the shear member is bent at $b$ into a U-shaped form and the looped end is then bent downwardly at $c$ until it lies parallel or approximately parallel with the main portion. The downwardly bent portion is then bent upwardly at $d$ until it is at an angle of 45° or thereabouts with the part previously bent downwardly. While I have stated that the bars forming the shear members are bent at $c$ prior to being bent at $d$ it will be readily understood that this is intended by way of illustration only and that the bends may be made in any order and by any means preferred which will result in the formation shown in the drawings.

The tension or other reinforcing bar $e$ to which the shear member is to be secured is dropped between the sides thereof until it rests upon the loop $b$ when pins or keys $f$ are driven transversely through the bent portions $c$ and $d$ located above and below the said bar, respectively. The said pins or keys can be straight but they are preferably tapered slightly as illustrated. These pins or keys $f$ may be employed singly as shown in Figs. 1 to 5 or they can be arranged in pairs and constructed as illustrated in Figs. 6 and 7 of the drawings.

It is obvious that the engaging end of the shear member can be shaped in a variety of ways into the form before described and that one set of pins or keys $f$ by being made of sufficient length can be employed to secure shear members to two or more reinforcing bars $e$ located parallel with and alongside of each other as shown in Fig. 2 of the drawings.

In the modification of the invention shown in Fig. 3 the shear member, after being looped at $b$, is formed with one bend only which preferably is arranged to take a key having two bearing points $g$ and $h$ on the bar $e$. By shaping the engaging end of the shear member as shown and employing a key as described a triangular locking grip is obtained on the bar to secure the shear member rigidly in position.

If preferred, the engaging end of the shear member can be shaped to take three or more pins or keys $f$ as illustrated in Fig. 4, in which case a greater amount of the bar $e$ is gripped by the shear member.

The shear members can be provided with similar fastening means at both ends (see Fig. 5) in order to permit of their attachment to two bars arranged parallel with or at an inclination to each other.

The shear members are placed as close together as is necessary to take shearing stresses for any given constructional design and they may be arranged at any preferred angle with the main reinforcing bars.

In the drawings I have shown a round bar $e$, but by suitably shaping the fastening end or ends of the shear members the invention is adaptable to any particular shape of bar. Furthermore, if it be desired the said shear members can be formed with only one leg or side projecting beyond the main reinforcing bar $e$.

The invention insures the correct placing of the shear members and their retention in position to suit the particular design being followed. Moreover, it enables lintel reinforcement consisting of two or more main reinforcing bars with any number of shear members necessary for said bars to be handled as one rigidly attached piece, thereby minimizing labor and eliminating risk through careless workmen.

The shear members rigidly attached to the main reinforcing bars in the manner hereinbefore described and as illustrated in the drawings may be of any length necessary so as to enter the compression zone in the concrete.

In Fig. 8 of the drawings the fastening means are shown as applied to ties or ligatures connecting two vertical bars $i$. In the construction shown the ends of a metal bar forming a tie or ligature are arranged to overlap at or about the center of its length and the said ends are turned and shaped to lie on opposite sides of a centrally located bar $j$. The ends of the tie when shaped as described retain the central bar $j$ in position parallel with the main reinforcing bars $i$.

Ties, ligatures or shear members of the above description can be employed for the purpose of retaining the vertical main reinforcing bars of a column in correct relationship to each other and insure rigidity of construction.

What I do claim is:

1. In reinforcing members for concrete construction, a main reinforcing bar, a shear member having a looped and doubly bent end doubly embracing said bar, and transversely disposed pins, keys or wedges inserted between and bearing against the bends of said shear member and said bar one bearing against the top and the other against the bottom of said bar.

2. In reinforcing members for concrete construction, a main reinforcing bar, a shear member having a looped end, said looped end being doubly bent in opposite directions and embracing said bar, and transversely disposed pins or keys combining with said bent portions of said shear member to exert a triangular grip on opposite sides of said bar, substantially as and for the purposes set forth.

3. In reinforcing members for concrete construction, a main reinforcing member or bar, a shear member having a looped end passing around said bar, double bends in said shear member on opposite sides of said main bar, and pins or keys passed transversely through the loops formed by said bends above and below said main bar, substantially as and for the purpose set forth.

4. In reinforcing members for concrete construction, a plurality of main reinforcing members arranged parallel with and alongside of each other, shear members each having a loop and doubly bent end doubly embracing said bars, and two transversely disposed pins or keys bearing on opposite sides of said main bars, said pins or keys locking the shear members to their respective main bars and forming a rigid connection between said main bars, substantially as and for the purposes set forth.

In testimony whereof I affix my signature in presence of two witnesses.

WILLIAM RUSSELL KERR.

Witnesses:
WILLIAM HENRY MURPHY,
WILLIAM A. ASHTON.